March 29, 1932.　　　　A. HERZ　　　　1,851,705
STEREOSCOPIC MOTION PICTURE
Filed Jan. 14, 1929
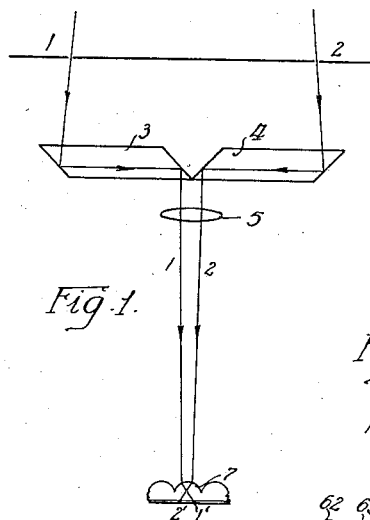
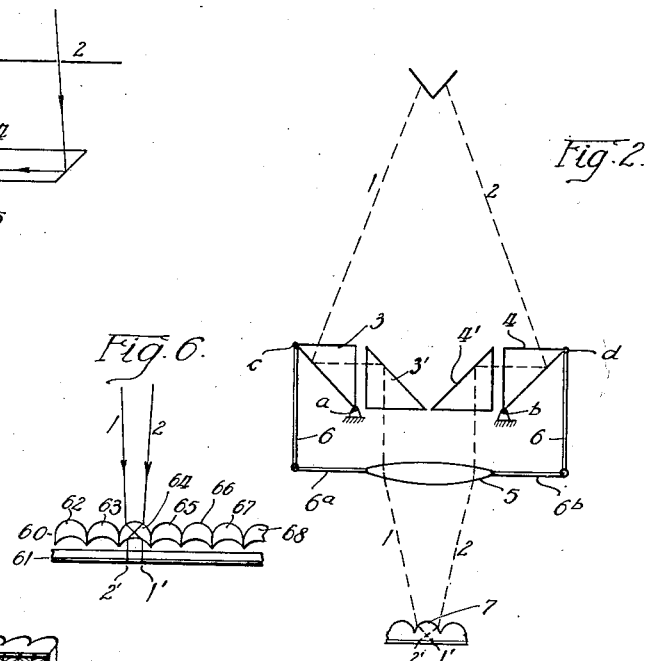
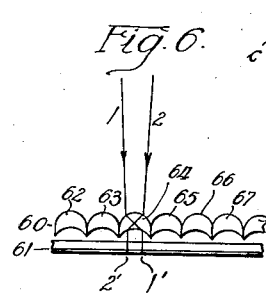
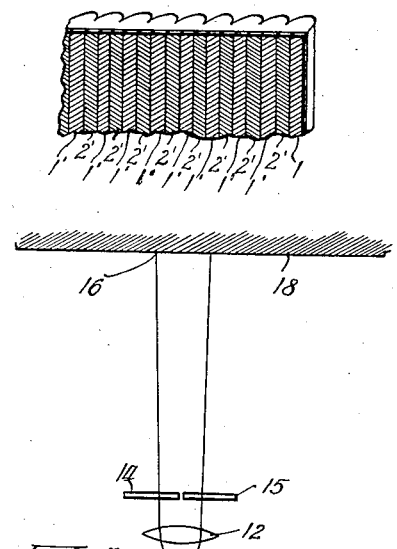
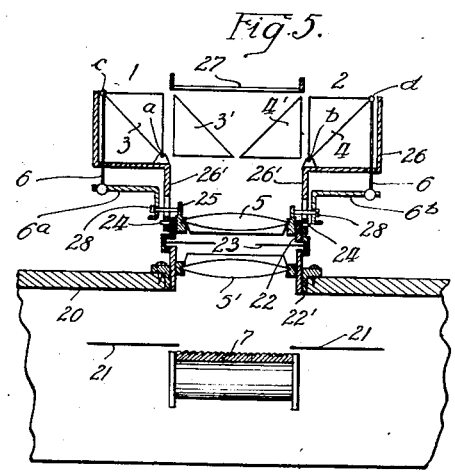
Inventor:
Alfred Herz.

Patented Mar. 29, 1932

1,851,705

UNITED STATES PATENT OFFICE

ALFRED HERZ, OF CHICAGO, ILLINOIS

STEREOSCOPIC MOTION PICTURE

Application filed January 14, 1929. Serial No. 332,345.

This invention relates to stereoscopic motion pictures and has for its principal object the production of such pictures by the use of a special film having one face moulded to resemble a plurality of cylindrical sections, which film constitutes a part of the lens system as well as a medium for recording pictures.

There is available on the market a motion picture film having one face smooth and one face formed as cylindrical sections lying parallel to each other and running lengthwise of the film. The emulsion is on the smooth face of the film. Light striking one side of the cylindrical section is diverted by the lens action of the film, to act upon only a small strip of the emulsion, and light striking the opposite side of the cylindrical section is directed to an adjacent strip.

In one embodiment of this film the so-called "natural color" pictures have been achieved. In the process and system employed in achieving these pictures the light acting on the film is separated into three parts, each coming through a color filter. The light, therefore, acts on the emulsion to produce three pictures of an object, each representing the object as seen through one of the three color filters. These pictures are broken into thin lines running lengthwise of the film by the surface of the cylindrical sections. This film, when used for the projection of pictures, breaks the light up into three elements, each of which is directed through a color mat corresponding to the filter through which the picture was taken. By this process the projected picture is shown in the same color combination as that of the original object.

In the present invention I employ a film of this type to produce stereoscopic motion pictures. I propose to expose this special film in a stereoscopic motion picture camera, which is adjusted so that the two images corresponding to the right and left apertures respectively, coincide upon the film. The image from the right aperture falls upon one side of the cylindrical surface, and the image from the left aperture falls upon the opposite side. The result of an exposure of this kind is the recording of two images on the film, those images being composed of thin vertical lines. The film is then developed, reversed and redeveloped by the standard process prescribed for films of this kind.

In projection, this film breaks the light into two parts, corresponding to the two images recorded thereon. I divert these parts through suitable lenses and color mats to a screen. With a color mat such as green on the left and a complementary color such as red on the right, the picture thrown upon the screen consists of a double image, the first image being in green and the second image in red. These images consist in effect of a series of fine vertical lines, which are substantially parallel to each other and which are broken up to project the objects in the picture. These lines appear on the screen first as a left image line with a right image line adjacent to it, and then another left image line on the other side of the right. In other words, the picture comprises a plurality of lines representing the left image with a second plurality of lines disposed between the first lines and representing the right image. Actually, of course, there is some overlapping of these lines and a consequent blending of the images on the screen. When this picture is viewed with a red glass over the left eye and a green glass over the right eye it presents the stereoscopic effect of depth and distance.

Amateur motion picture cameras are relatively common, but there are few stereoscopic cameras of this kind, and in order to convert these ordinary motion picture cameras into stereoscopic cameras I have provided a prism assembly which can be readily attached to an existing camera. This converts the camera to a stereoscopic camera in which a cylindrical faced film may be exposed to record stereoscopic pictures.

The preferred form of camera is one incorporating the prisms within the camera itself, but the attachment of prisms to an existing camera satisfactorily records stereoscopic pictures and thereby extends the advantages of these pictures to those already having motion picture cameras.

Amateur motion picture film having cylindrical sections formed on one face is more expensive than plain film and moreover it may not always be readily obtainable on the open market. The stereoscopic motion picture system of my invention is not solely dependent upon the use of this film, as I have provided a lens system which permits recording stereoscopic pictures on plane faced amateur film.

In this embodiment of my invention I have equipped the camera with a series of cylindrical lenses, placed adjacent to the film and between it and the lens system of the camera. This cylindrical lens replaces the cylindrical faced film by separating the right and left images to permit recording them side by side on a plane faced film.

In the drawings I show my invention diagrammatically to enable those skilled in the art to acquire a clear understanding of it.

Fig. 1 is a diagrammatic representation of the picture recording process.

Fig. 2 is a representation of a modification of the recording process.

Fig. 3 is a highly magnified view of the film used in this invention shown in perspective.

Fig. 4 is a representation of the projecting of the picture recorded by the process shown in Figs. 1 or 2.

Fig. 5 is a cross sectional view of one form of my prism attachment mounted on a motion picture camera.

Fig. 6 is a diagrammatic representation of my cylindrical lens system for recording stereoscopic pictures on an ordinary plane faced film.

Referring now to Fig. 1 more in detail, I show the left and right apertures 1 and 2 respectively, and the prisms 3 and 4 which direct the light from these apertures through the lens 5 to the film 7. For convenience I have shown film 7 as comprising only one cylindrical section. Actually the cylinders on this film are very small, being of the order of about two-thousandths of an inch in width.

Standard amateur 16 mm. film has a width of approximately five-eighths of an inch, so that the film surface actually contains several hundred of such cylindrical sections instead of the one which I have shown.

Light entering the camera through the left aperture 1 is reflected by the prism through the lens 5 and focused upon the left hand section of the cylindrical surfaces of the film. This light passes through the film and acts on the emulsion behind the right half of that cylindrical section to record an image thereon, as indicated at 1.

Similarly, light entering the camera through aperture 2 is reflected by the prism 4 through the lens 5 to the right hand section of the film 7 through which it passes to act upon the emulsion behind the left half of the cylinder. The light from the aperture 2 then records a series of vertical lines upon the left hand section of the emulsion.

From the foregoing it will be seen that the film itself acts as a lens, diverting the light received on the left side of the cylindrical face to the right and the light received on the right of the face to the left. The rays of light are thus made to cross each other in the film itself and to act on the emulsion at a point displaced from their point of entry to the film.

The image so recorded comprises strips or lines of the image seen through the left aperture alternated with strips or lines of the image seen through the right aperture. The lens system reverses these images in the usual manner so that the top of the picture appears at the bottom of the film and the right of the picture at the left of the film.

In Fig. 3 I show a film so exposed highly magnified to more clearly bring out the action. The one side of the film contains the plurality of cylindrical sections shown, and the light from the aperture 1 acts upon that portion of the emulsion indicated by the reference numeral 1, while the light from the aperture 2 acts upon the portions indicated by the reference numeral 2'.

The film so exposed is developed and reversed in the usual manner. This makes the black portions of the image black and the white portions transparent or white, but does not alter the position of the image on the film. That is, the combined portions 1' produce the image seen through the aperture 1, that image being upside down and with the right side to the left of the film. The combined portions 2' likewise produce the image seen through aperture 2.

The projecting of the pictures so recorded is shown in Fig. 4 in which the light from source 10 is collected by the condenser 11 and focused upon the film 7. The light projected through the film 7 is collected by the plano concave lens 19 and directed to the lens 12 which focuses it through the color mats 14 and 15 to the screen 18. By this process the thin lines representing the image seen through the left aperture of the camera are projected through the color mat 14 to the point 16 upon the screen. This color mat 14 may be either green or blue, preferably green, and should be a pure color. The images 16 appear upon the screen as a series of thin vertical lines which, for example, we will assume are green in color.

Similarly the images recorded upon the other side of the film 7 representing the object as viewed through the aperture 2, are projected through the color mat 15 to the point 17 upon the screen 18. The color mat 15 is a color complementary to that of the mat 14 and is preferably red, and the images on the screen 18 comprise a series of vertical parallel lines preferably red in color.

The image so projected upon the screen 18 is viewed through a color mat held before the eye, this mat being arranged with a red glass over the left eye and a green glass over the right. The picture so viewed displays depth and distance more accurately than has been possible heretofore because of the intermingling of the fine vertical lines composing the picture and because of the absence of horizontal lines which have heretofore proven themselves objectionable for this type of picture.

When an object is moving toward the human eyes the eyes toe in as the distance to the object decreases, and if the object approaches close enough, the pupils of the eyes are focused upon the object in a manner giving the appearance that their lines of vision are crossed. In other words, the axes of the pupils are shifted to a more obtuse angle relative to each other. This toeing in of the eyes can be reproduced on the film if the prisms through which the film is exposed are toed in as the range of the camera is decreased. In Fig. 2 I show an arrangement for producing this effect.

The single large prisms 3 and 4 are replaced each by two prisms 3 and 3' and 4 and 4' respectively. The center prisms 3' and 4' are fixed with respect to the lenses of the camera. Prisms 3 and 4 are pivoted at $a$ and $b$ respectively to move with respect to each other and to the prisms 3' and 4' respectively. Links 6, 6 are pivoted to the outer corners $c$ and $d$ of prisms 3 and 4, these links being pivotally connected to arms $6a$—$6b$ carried by lens 5. When the camera lens 5 is moved forward to focus the camera for a close-up picture, the prisms 3 and 4 are swung toward each other on their pivots $a$ and $b$ by the action of links 6, 6 which are pivoted on arms $6a$ and $6b$ moving with the lens 5. The apex of the vision cone, represented by the dotted lines 1 and 2, is therefore moved nearer the lens and a toeing-in effect is thereby produced.

In Fig. 5 I show my prism assembly attached to an ordinary motion picture camera by a preferred one of the many forms of attachments with which it may be used. The prisms 3 and 3' and 4 and 4' are mounted in the housing 26 so that prism 3 lies back of aperture 1 and prism 4 back of aperture 2. The plate 27 excludes all light from prisms 3' and 4' except that reflected thereto by prisms 3 and 4 respectively. On the camera side of the housing 26 is the mounting extension 26' which is made to conform to and snugly fit over the portion 22 of the lens housing. The cylinder 26' is equipped with a slot, not shown, into which the pins 24 fit. This slot is preferably L-shaped so that the prism housing is attached by motion axially of the lenses followed by a turning to lock the assembly in place.

The lens housing 22 supports the lenses 5 and 5' and the iris 23 in the camera box 20, and when the prisms are attached to the portion 25 they are held in proper relation to the lenses of the camera and film 7. The shutters 21 of the camera regulate the exposure of the film in the usual manner. The prisms 3 and 4 are pivoted at $a$ and $b$ respectively, and pivotally connected at points $c$ and $d$ to the rods 6. These rods are in turn pivoted to L members $6a$ and $6b$ which are fastened to the lens carrier 25 by screws 28 which extend through slots in the mounting 26'. When the lens 5 is moved to focus the camera, prisms 3 and 4 are turned on their pivots by levers 6, $6a$ and $6b$ in the obvious manner, to toe in these prisms.

The attachment of prisms to a camera in the manner indicated converts the camera into a stereoscopic motion picture camera, in which a cylindrical surfaced film may be exposed in accordance with the teachings of my invention.

I have illustrated in Fig. 5 one specific manner of attaching a prism assembly to a camera by way of example only. The specific details of making such an attachment must be varied greatly to register with existing cameras, and this can be done by one skilled in the art in accordance with the teachings of my invention, and I am not, therefore, to be limited by the specific disclosure shown. The particular form of mounting is of no moment so long as it provides for definitely aligning the base line of prisms 3, 3', 4, 4' with the base line of the picture on film 7.

In Fig. 6 I show a cylindrical lens 60 disposed in the path of light ahead of the plane faced film 61. This lens 60 comprises a plurality of sections 62—68 inclusive, each section having a convex cylindrical section of one radius ground on its upper face, and a concave cylindrical section of greater radius ground on its lower face, which is next to the film. Light from aperture 1 is directed by the prisms and lens, as shown in Figs. 1 or 2, to the left sides of the sections 62—68. This light enters the lens 60, crosses to the right in it and emerges from the right side of the concave cylinder. When the light emerges it is directed to the film 61 entering at practically right angles to the plane of that film. Similarly light from aperture 2 is directed to the film 61 where it acts on a strip of emulsion adjacent to and at the right of the strip on which the light from aperture 1 acts.

Thus it will be seen that the lens 60 separates the light admitted through the two apertures, directing the light from one aperture to thin strips of the film 61 and the light from the other aperture to other strips disposed between the first strips. The action of this lens 60 is, therefore, the same as that of the cylindrical sections of the film 7.

In manufacturing the lens 60 sections 62 to 68 inclusive may be ground into a single piece of glass. Preferably, however, the sections 62 to 68 are ground separately and are then cemented together to form the lens. Since no light passes through the edges of the sections, the cement does not interfere with the action of the lens in any way.

To project the stereoscopic pictures so recorded on the plane faced film a lens 60 is disposed between the film 61 and projection lenses to separate the images and to direct each through its proper color mat. This is accomplished by the substitution of lens 60 and film 61 in the showing in Fig. 4 for the film shown therein the lens 60 being placed adjacent to the plano concave lens 19, and the film 61 between it and the condenser 11. Otherwise the projection system shown in Fig. 4 remains unchanged.

While I have chosen to show a particular arrangement of prisms, lenses, etc. in illustrating the principle of my invention, I have done so by way of example only as there are many modifications and adaptations which can be made by one skilled in the art without departing from the teachings of the invention.

It will be of course, understood that while I have illustrated prisms and single lens systems, I do not wish to be limited thereto. As will be understood by those skilled in the art, other reflecting and refracting mediums and various arrangements thereof well known in the art may be employed instead, without altering the principles or processes outlined herein and without departing from the essence of the invention, or the spirit and scope of the appended claims.

Having thus shown and described a preferred embodiment of my invention, what I consider new and desire to have protected by Letters Patent is pointed out in the appended claims.

What I claim is:

1. In a stereoscopic motion picture camera, a lens system, a plurality of prisms for collecting and directing the light admitted to said lens, pivotal means for supporting certain ones of said prisms, means for supporting a film upon which the light so admitted is focused, said lens system or parts thereof being movable away from said film to focus the camera on a nearby object and means connected to said pivotally mounted prisms and controlled by said lens motion for changing the position of the reflecting surfaces of those prisms.

2. In a stereoscopic motion picture camera, a lens systems, a plurality of prisms for collecting and directing the light admitted to said lens, certain ones of said prisms being pivotally mounted, means for supporting a film upon which the light so admitted is focused, said lens or parts thereof being movable away from said film to focus the camera on a nearby object, and means connected to said pivotally mounted prisms and controlled by said lens motion for moving the free edges of said pivoted prisms closer together when said camera is focused on a nearby object.

3. In a stereoscopic motion picture camera, a lens system, said system containing a lens which is movable forwardly and backwardly to focus the camera a pair of prisms disposed in front of and to the left of the axis of said lens system, said prisms comprising an inner fixed prism and an outer pivoted prism, a second pair of prisms disposed in front of and to the right of the axis of said lens system, said second pair also comprising a fixed inner and pivoted outer prism, and levers attached between said pivoted prisms and said movable lens for moving the prisms about their pivots toward said fixed prisms when said movable lens is moved forward to focus the camera.

4. In a stereoscopic motion picture camera, a lens systems, said system containing a lens which is movable forwardly and backwardly to focus the camera, a pair of prisms disposed in front of and to the left of the axis of said lens system, said prisms comprising an inner fixed prism and an outer pivoted prism, a second pair of prisms disposed in front of and to the right of the axis of said lens system, said second pair also comprising a fixed inner and pivoted outer prism, and levers attached to said pivoted prisms and to said movable lens for moving said prisms about their pivots toward and away from said fixed prisms as said movable lens is moved forward and backward respectively to focus said camera.

In witness whereof, I hereunto subscribe my name this 11th day of January, 1929.

ALFRED HERZ.